May 1, 1962 W. W. WEESE 3,032,058
THERMALLY RESPONSIVE VALVE MECHANISM
Filed March 16, 1960 2 Sheets-Sheet 1

INVENTOR
*W. W. Weese*
BY *Burns, Doane, Benedict & Drous*
ATTORNEYS

May 1, 1962 W. W. WEESE 3,032,058
THERMALLY RESPONSIVE VALVE MECHANISM
Filed March 16, 1960 2 Sheets-Sheet 2
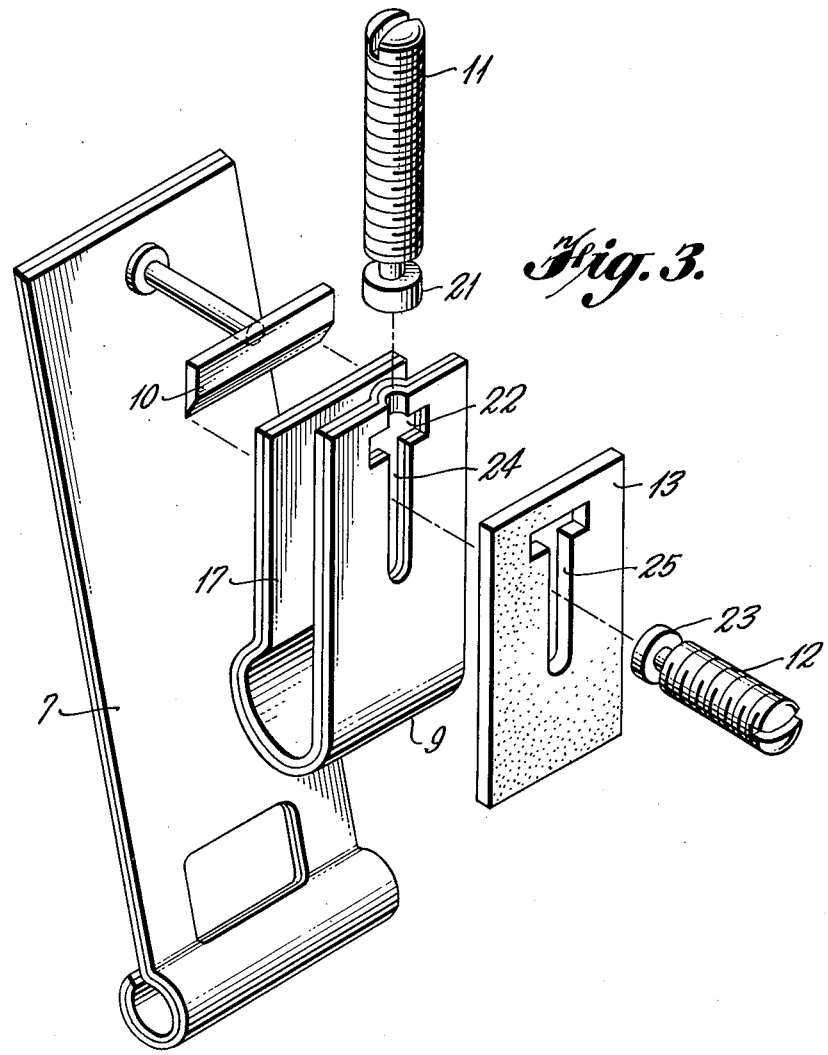
INVENTOR
W. W. Weese
BY 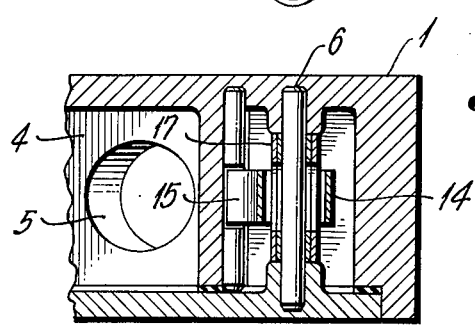
ATTORNEYS

United States Patent Office 3,032,058
Patented May 1, 1962

3,032,058
THERMALLY RESPONSIVE VALVE MECHANISM
Wilfred W. Weese, Tampa, Fla., assignor to Speakman Company, Wilmington, Del.
Filed Mar. 16, 1960, Ser. No. 15,428
5 Claims. (Cl. 137—468)

This invention relates to a thermally responsive valve mechanism characterized by a completely automatic mode of operation.

In conveying fluids susceptible to temperature fluctuations, it is frequently necessary to insure that fluids having an abnormal temperature are not transmitted. This results in a requirement for a mechanism for interrupting the flow of fluid when it either exceeds or falls below a particular critical temperature. Industrially these mechanisms are required in connection with apparatus such as heat transfer units. In ordinary residences, flow interruptions responsive to temperature changes are important in connection with such items as faucets and shower heads.

In providing a mechanism to interrupt fluid flow responsive to temperature fluctuations, a number of functional criteria become significant. Flow interruptions must be positive and immediately responsive to temperature changes. If at all possible, the flow control apparatus should include automatic resetting features to reduce manual manipulation to the lowest possible degree.

In the prior art, the flow control problem heretofore described has been recognized. A variety of devices have been proposed for effecting temperature responsive flow control but each is deficient in respect to one or more of the functional criteria above outlined. In addition, they frequently are so structurally complex as to be economically impractical, difficult to operate, and vulnerable to mechanical failure so as to require inordinate service and maintenance.

In recognition of the failings of the prior art devices, there is now proposed a thermally responsive valve mechanism characterized by a positive and immediate acting flow shut-off feature, positive holding means for retaining the shut-off mechanism in an inoperative position during acceptable flow conditions, and means for automatically resetting the shut-off mechanism upon the cessation of fluid inflow.

In addition to the functional advantages achieved through this mechanism, a structural arrangement of such overall simplicity is provided that continuity of operation unimpaired by performance variations induced by structural complexity is achieved, problems and costs of fabrication are reduced to a minimum, and the degree of service and maintenance required is substantitlly reduced over functionally comparable prior art structures.

The mechanism of this invention includes a valve body provided with a fluid inlet, a fluid outlet, and a ported wall separating the inlet and outlet. Mounted upstream of the ported wall is a movable closure assembly and latch means for restraining the assembly in a position spaced from the wall port. Associated with the closure assembly are resilient means for urging the assembly toward the latch means. Included in the closure assembly are a wall port sealing surface, a thermally actuable releasing means which tends to flex to separate the assembly from the latch means under the influence of temperature change, and a fluid reaction surface exposed to fluid inflow. Included in the latch means are a thermally actuable holding member which tends to flex to release the closure assembly under the influence of temperature change whereby fluid inflow reacting against the closure assembly reaction surface urges the wall port sealing surface of the closure assembly toward the wall port to close the port and effect a flow cessation. Upon the interruption of the inflow fluid pressure and resulting reaction force imposed upon the closure assembly reaction surface, the biasing effect of the resilient means associated with the closure assembly returns the assembly to its inoperative position in engagement with the latch means.

The valve mechanism having been generally described, its specific structure and mode of operation will now be explained with reference to the accompanying drawings:

FIGURE 3 is a perspective assembly view of the closure and latch included in the mechanism.

FIGURE 4 is a sectional view taken along the line 4—4 of FIGURE 1.

Figures 1, 2:
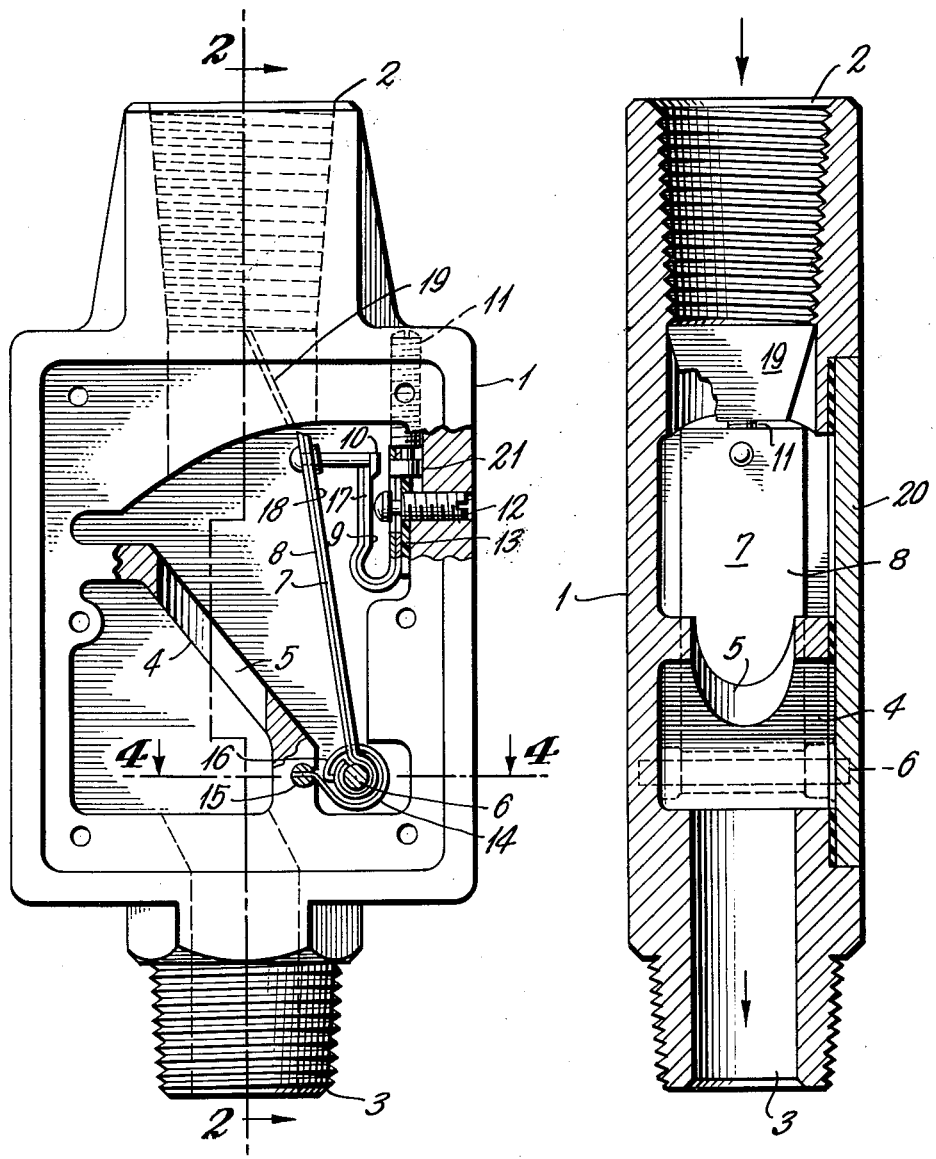
FIGURE 1 is a side elevation view of the mechanism with the mechanism housing cover plate removed.
FIGURE 2 is a sectional view taken along the line 2—2 of FIGURE 1.

The FIGURE 1 side elevation and the FIGURE 2 sectional view disclose the mechanism as including a valve body 1, a fluid inlet 2, a fluid outlet 3, and wall 4 separating the inlet and outlet, which wall is provided with a port 5. Pivotally mounted on an axle 6 extending transversely through valve body 1 is a closure assembly. This assembly, as illustrated, comprises a thermally responsive bimetallic leaf 7 pivotable from the inoperative position shown to a position in engagement with intermediate wall 4. When in engagement with wall 4, surface 8 of leaf 7 effectively closes and seals port 5.

Latch means are provided for holding bimetallic leaf 7 in the inoperative position shown in FIGURE 1, spaced from intermediate wall 4. Included in the latch means, as shown in disassembled perspective in FIGURE 3, are a bimetallic thermally responsive holding clip 9, a detent 10 extending from the free end of leaf 7 to engage the lip of holding clip 9, and an adjusting screw 11 secured by head 21 to slot 22 of clip 9 for altering the position of holding clip 9 relative to detent 10. To secure holding clip 9 in an adjusted position, a clamping screw 12 is provided, having a head 23 engaging clip 9 through slot 24. To thermally insulate bimetallic holding clip 9 from valve body 1, insulating member 13 is provided, having a slot 25 through which clamping screw 12 may extend.

To urge leaf 7 toward holding clip 9, a coil spring 14 is provided. As indicated in FIGURE 1 and FIGURE 4, one end 15 of coil spring 14 is secured to the valve body while the other end 16 is secured to the lower portion of bimetallic leaf 7.

In operation the valve mechanism may be connected at inlet 2 to an incoming source of fluid while the outlet 3 may be connected to a downstream conduit or outlet fixture such as a shower head or faucet. During normal operation, bimetallic leaf 7 is secured in position by holding clip 9. Bimetallic closure leaf 7 as well as bimetallic holding clip 9, being exposed to incoming fluid are immediately affected by the fluid temperature change.

Both bimetallic members 7 and 9 are designed to flex toward wall 4 in response to an undesired temperature change such as sudden and excessive increase. In moving toward intermediate wall 4 in response to a temperature rise, bimetallic closure leaf 7 will exert a substantial releasing force on detent 10. When free portion 17 of holding clip 9 has flexed sufficiently to allow detent 10 to override the upper edge of clip free portion 17, the releasing force will tend to effect a particularly positive release action. The release reaction time, of course, may be varied by modifying through adjusting screw 11 the degree of engagement of portion 17 of clip 9 with detent 10.

Even after being released from holding clip 9, bimetallic closure leaf 7 remains biased toward clip 9 by coil spring 14. As shown, however, leaf 7 even in its restrained or latched position has surface 18 exposed to the incoming flow of liquid. This surface thus functions as a fluid reaction surface responsive to the flow force of incoming fluid. As the resilient character of coil spring 14 is such that its biasing force on leaf 7 is less than the oppositely acting reaction force imposed on surface 18 by the liquid line pressure, the imposed reaction force causes closure leaf 7 to move toward wall 4 where surface 8 may engage and seal wall port 5. Port sealing surface 8 will be retained in engagement with port 5 so long as line pressure exists at inlet 2 to react against surface 18.

To restore the valve mechanism to the inoperative position shown in FIGURE 1, it is only necessary to shut off the flow of water into the valve mechanism so as to remove the liquid reaction force imposed on face 18. Upon the removal of this reaction force, the biasing force of coil spring 14 returns closure leaf 7 to its engaged relationship with holding clip 9.

To insure the timely thermal response of the latch means, a deflector 19 is provided in inlet 2 to direct a portion of the incoming liquid against the thermally sensitive holding clip 9. Such a refinement is highly advantageous insofar as securing optimum performance is concerned. This arrangement permits the latch means to be positioned outside the principal path of fluid flow to provide the minimum obstruction to this flow but insures near instantaneous response of the latch to flow temperatures. Notwithstanding the obvious merits of this arrangement, it will be appreciated that the mode of operation of the combination of bimetallic closure leaf 7 and bimetallic holding clip 9 could be obtained through less desirable arrangements such as positioning holding clip 9 in the principal fluid flow path or eliminating deflector 19 and relying on the transmission of heat from the incoming fluid through the valve body and through eddy currents in the vicinity of clip 9.

Access to the interior of valve body 1 for purposes of maintenance or inspection is afforded by valve body cover 20.

Although this invention has been described with reference to a preferred embodiment, several alternative structures are immediately obvious. Thus, although in the thermally actuable valve, the closure member and holding clip have been described as bimetallic strips, other thermally actuable devices such as bi-plastic strips, metalplastic strips, or ceramic strips would in many instances prove satisfactory. Similarly, although the fluid reaction surface and port sealing surface of the closure assembly have been illustrated as mere opposing faces of the bimetallic closure leaf, these surfaces may well be located on specially fabricated components carried by the leaf.

Insofar as the positioning of the valve mechanism is concerned, it may be located in direct communication with a fixture which is desired to be controlled, such as a faucet or shower head, or in certain instances, such as in industrial flow control applications, may be utilized solely as a conduit flow control mechanism to control a completely confined fluid flow.

Although in most instances the mechanism would be adapted to effect flow cut off in the event of excessive flow temperatures, through the use of suitable thermally actuable flexing members, control may be effected in response to abnormally low temperatures.

It will also be appreciated that while the mechanism is most efficaciously suited for control of noncompressible fluid or liquid flow, it may also function in controlling compressible fluid flow.

In the description of the general mode of operation of the mechanism, the advantages accruing from immediate and positive flow shut-off feature and the automatic resetting features are readily apparent. Also apparent is the desirability of the positive manner in which the closure assembly is restrained in an inoperative position during normal flow conditions. In achieving such desirable flow control features, there has been evolved a mechanism characterized by a minimum of moving parts and of maximum structural simplicity. The few moving parts insure the necessity of only nominal maintenance, the structural simplicity resulting in ease and economy of fabrication.

The invention having been described in detail with respect to functional and structural features, its full and proper scope is set forth in the appended claims.

I claim:

1. A thermally responsive valve mechanism comprising a valve body including a fluid inlet and a fluid outlet, a ported wall within said body separating said inlet and outlet, a movable closure assembly mounted upstream of said wall, latch means for restraining said closure assembly in a position spaced from said wall, and resilient means urging said closure assembly into engagement with said latch means, said closure assembly including a surface for sealing said wall port, an integral, thermally actuable releasing means which tends to flex the portion of said closure assembly restrained by said latch means to separate said assembly from said latch means under the influence of temperature change, and a fluid reaction surface exposed to valve inlet flow, said latch means including a thermally actuable holding member which tends to flex and thus act in conjunction with said releasing means to release said closure assembly from said latch means under the influence of temperature change whereby inlet flow reacting against said closure assembly reaction surface urges said wall port sealing surface toward said wall to close said port, a cessation of said inflow resulting in said closure assembly being returned to engagement with said latch means by said resilient means.

2. A thermally responsive valve mechanism comprising a valve body including a fluid inlet and a fluid outlet, a ported wall within said body separating said inlet and outlet, a movable closure assembly mounted upstream of said wall, latch means for restraining said closure assembly in a position spaced from said wall, and resilient means urging said closure assembly into engagement with said latch means, said closure assembly including a surface for sealing said wall port, an integral thermally actuable bimetallic releasing means which tends to flex the portion of said closure assembly restrained by said latch means to separate said assembly from said latch means under the influence of temperature change, and a fluid reaction surface exposed to valve inlet flow, said latch means including a thermally actuable bimetallic holding member which tends to flex and thus act in conjunction with said releasing means to release said closure assembly from said latch means under the influence of temperature change whereby inlet flow reacting against said closure assembly reaction surface urges said wall port sealing surface toward said wall to close said port, a cessation of said inflow resulting in said closure assembly being returned to engagement with said latch means by said resilient means.

3. A thermally responsive valve mechanism comprising a valve body including a fluid inlet and a fluid outlet, a ported wall within said body separating said inlet and outlet, a bimetallic leaf wall port closure pivotally mounted upstream of said wall, latch means for restraining said closure in a position spaced from said wall, and resilient means urging said closure into engagement with said latch means, said closure tending to flex to separate itself from said latch means under the influence of temperature change and including a lower surface for sealing said wall port and an upper fluid reaction surface exposed to valve inlet flow, said latch means including a thermally actuable bimetallic holding member which tend to flex and thus act in conjunction with said releasing means to release said closure from said latch means under the influence of temperature change whereby inlet flow reacting against said closure reaction surface urges said closure wall port sealing surface toward said wall to close said port, a cessation of said inflow resulting in said closure being returned to engagement with said latch means by said resilient means.

4. A thermally responsive valve mechanism comprising a valve body including a fluid inlet and a fluid outlet, a ported wall within said body separating said inlet and outlet, a bimetallic leaf wall port closure pivotally mounted upstream of said wall, latch means for restraining said closure assembly in a position spaced from said wall, adjusting means for modifying the restraining effect of said latch means on said closure, and resilient means urging said closure into engagement with said latch means, said resilient means including a coil spring engaging the pivotally mounted portion of said closure, said closure tending to flex to separate itself from said latch means under the influence of temperature change and including a lower surface for sealing said wall port and an upper fluid reaction surface exposed to valve inlet flow, said latch means including a thermally actuable bimetallic holding member which tends to flex and thus act in conjunction with said releasing means to release said closure from said latch means under the influence of temperature change whereby inlet flow reacting against said closure reaction surface urges said closure wall port sealing surface toward said wall to close said port, a cessation of said inflow resulting in said closure being returned to engagement with said latch means by said resilient means.

5. A thermally responsive valve mechanism comprising a valve body including a fluid inlet and a fluid outlet, a ported wall within said body separating said inlet and outlet, a bimetallic leaf wall port closure pivotally mounted upstream of said wall, latch means mounted upstream of said wall and laterally of the principal flow path through said valve for restraining said closure assembly in a position spaced from said wall, deflecting means for directing a portion of fluid inflow against said latch means, adjusting means for modifying the restraining effect of said latch means on said closure, and resilient means urging said closure into engagement with said latch means, said resilient means including a coil spring engaging the pivotally mounted portion of said closure, said closure tending to flex to separate itself from said latch means under the influence of temperature change and including a lower surface for sealing said wall port and an upper fluid reaction surface exposed to valve inlet flow, said latch means including a thermally actuable bimetallic holding member which tends to flex to release said closure from said latch means under the influence of temperature change whereby inlet flow reacting against said closure reaction surface urges said closure wall port sealing surface toward said wall to close said port, a cessation of said inflow resulting in said closure being returned to engagement with said latch means by said resilient means.

References Cited in the file of this patent
UNITED STATES PATENTS

| | | |
|---|---|---|
| 362,973 | Kieley | May 17, 1887 |
| 556,023 | Pew | Mar. 10, 1896 |
| 2,006,153 | Trix | June 25, 1935 |